United States Patent
Citta et al.

(10) Patent No.: US 8,791,839 B2
(45) Date of Patent: Jul. 29, 2014

(54) ULTRASONIC PASSENGER DETECTION

(75) Inventors: James W. Citta, Lombard, IL (US); Robert Urman, Schaumburg, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 875 days.

(21) Appl. No.: 12/992,319

(22) PCT Filed: May 13, 2009

(86) PCT No.: PCT/US2009/043724
§ 371 (c)(1),
(2), (4) Date: Feb. 7, 2011

(87) PCT Pub. No.: WO2009/148780
PCT Pub. Date: Dec. 10, 2009

(65) Prior Publication Data
US 2011/0132093 A1   Jun. 9, 2011

Related U.S. Application Data

(60) Provisional application No. 61/085,977, filed on Jun. 5, 2008.

(51) Int. Cl.
*G08G 1/04* (2006.01)
*G01S 7/527* (2006.01)
*G01S 7/52* (2006.01)
*G01S 15/04* (2006.01)
*E05F 15/00* (2006.01)

(52) U.S. Cl.
CPC ........... *G01S 15/04* (2013.01); *E05Y 2900/506* (2013.01); *G01S 7/527* (2013.01); *E05F 2015/0039* (2013.01); *G01S 7/52006* (2013.01); *E05Y 2900/51* (2013.01)
USPC ........ 340/943; 340/518; 340/528; 340/545.1; 340/552; 340/561

(58) Field of Classification Search
CPC ............ B60R 7/04; B60R 2021/01537; E05F 15/0026; E05F 2015/0039; G01S 17/026
USPC .............. 340/518, 528, 545.1, 552, 561, 943; 73/632; 367/93, 95
See application file for complete search history.

(56) References Cited

U.S. PATENT DOCUMENTS

| | | | |
|---|---|---|---|
| 4,347,590 A * | 8/1982 | Heger et al. | 367/93 |
| 4,382,291 A * | 5/1983 | Nakauchi | 367/93 |
| 4,565,029 A * | 1/1986 | Kornbrekke et al. | 49/25 |
| 4,634,947 A | 1/1987 | Magori | |

(Continued)

FOREIGN PATENT DOCUMENTS

| | | |
|---|---|---|
| DE | 19538071 A1 | 4/1997 |
| JP | 7146355 A | 6/1995 |

(Continued)

*Primary Examiner* — Daniel Wu
*Assistant Examiner* — Son M Tang
(74) *Attorney, Agent, or Firm* — The Webb Law Firm

(57) ABSTRACT

A method and apparatus of recognizing the presence of a passenger in front of a door of a transit vehicle comprises directing an ultrasound transmitter/receiver at a volume of space adjacent the door, emitting an ultrasound pulse into the empty volume, recording and integrating intensity of the echoes and storing the integrated value as a standard value, repeatedly emitting an ultrasound pulse into the volume, and comparing the integrated values to the standard value.

10 Claims, 3 Drawing Sheets

(56) References Cited

U.S. PATENT DOCUMENTS

| | | | |
|---|---|---|---|
| 4,654,834 A * | 3/1987 | Dorr | 367/96 |
| 4,779,240 A * | 10/1988 | Dorr | 367/96 |
| 4,823,010 A * | 4/1989 | Kornbrekke et al. | 250/341.7 |
| 5,021,644 A * | 6/1991 | Beran et al. | 250/221 |
| 5,132,662 A * | 7/1992 | Burch | 340/433 |
| 5,142,152 A * | 8/1992 | Boiucaner | 250/341.7 |
| 5,148,410 A * | 9/1992 | Kuhn | 367/96 |
| 5,943,295 A | 8/1999 | Varga et al. | |
| 5,963,000 A * | 10/1999 | Tsutsumi et al. | 318/480 |
| 6,114,956 A * | 9/2000 | Van Genechten | 340/552 |
| 6,275,146 B1 * | 8/2001 | Kithil et al. | 340/425.5 |
| 6,344,642 B1 * | 2/2002 | Agam et al. | 250/221 |
| 6,611,759 B2 * | 8/2003 | Brosche | 701/301 |
| 6,678,999 B2 * | 1/2004 | Zengguang et al. | 49/25 |
| 7,130,244 B2 * | 10/2006 | Gal et al. | 367/98 |
| RE41,674 E * | 9/2010 | Sasaki et al. | 318/282 |
| 8,510,990 B2 * | 8/2013 | Agam et al. | 49/28 |
| 2006/0061470 A1 | 3/2006 | Hofbeck et al. | |

FOREIGN PATENT DOCUMENTS

| | | |
|---|---|---|
| JP | 2000215356 A | 8/2000 |
| JP | 2002513358 A | 5/2002 |
| JP | 2005307678 A | 11/2005 |
| KR | 1020050067237 A | 6/2005 |
| WO | 9848372 A1 | 10/1998 |

* cited by examiner

ULTRASONIC PASSENGER DETECTION

BACKGROUND OF THE INVENTION

1. Field of the Invention

This invention relates to an ultrasonic method and system for detecting passengers at a door of a transit vehicle without the need to define a plurality of dead zones.

2. Description of Related Art

Present ultrasonic detection methods used to detect and respond to the presence of passengers in the vicinity of a bus or other transit vehicle doorway are based on first detecting and memorizing a signature table for a "standard" environment, for example, with the doors closed and no passengers or objects in the vicinity other than permanent equipment. The table consists of echo response times that define the echoes from permanent equipment. These times are represented by a one bit digitalization of the echo signal in a memory or register position corresponding to echo return time. The amplitude of the echo is not considered. See, for example, Kuhn U.S. Pat. No. 5,148,410 entitled "Sonar Detector for Exiting Passengers." When a passenger or object not previously in the vicinity of the door causes an echo response at a time not previously recorded, the passenger or object is considered detected. If, however, the echo from a passenger or object occurs at the same time (within established tolerances) as previously memorized, the response is ignored. There is no way to discriminate that response from a response due to permanent bus equipment. In effect, the memorized responses with their tolerances represent "dead zones."

Repeatedly integrating the echoes following shifted multiple echo pluses to discriminate targets that are straight-on from off-axis targets has been suggested in Magori U.S. Pat. No. 4,634,947 entitled "Method for Evaluating Echo Signals of an Ultrasonic Sensor on a Robot Arm."

SUMMARY OF THE INVENTION

Briefly, according to one embodiment of this invention, there is provided a method of recognizing the presence of a passenger in front of a door of a transit vehicle comprising the steps of directing an ultrasound transmitter/receiver at a volume of space adjacent the door and generally directed at the floor in front of the door, emitting an ultrasound pulse via the transmitter/receiver into the volume of space while the space is not occupied by a passenger, recording the ultrasound echoes from objects in the volume of space for a response period, integrating intensity of the echoes during at least a fixed portion of the response period and storing the integrated value as a standard value, repeatedly emitting an ultrasound pulse via the transmitter/receiver into the volume of space, recording the ultrasound echoes, integrating the intensity of the echoes during the fixed period, repeatedly comparing the integrated values to the standard value such that when the standard value differs by a fixed value, a passenger is deemed to have entered the volume of space adjacent the door such that the door may be opened if appropriate. In a preferred embodiment, multiple ultrasound transmitter/receivers are directed at the volume of space adjacent the door and generally directed at the floor and integrated echoes received at each transmitter/receiver are summed.

Briefly, according to another embodiment of this invention, there is provided a system for recognizing the presence of a passenger adjacent to a door of a transit vehicle comprising an ultrasound transmitter/receiver directed at a volume of space adjacent the door and generally directed at the floor near the door, a controller for triggering an ultrasound pulse via the transmitter/receiver into the volume of space while the space is not occupied by a passenger, recording the ultrasound echoes from objects in the volume of space for a response period, integrating the intensity of the echoes during at least a fixed portion of the response period and storing the integrated signals. The controller is programmed to repeatedly emit an ultrasound pulse via the transmitter/receiver into the volume of space adjacent the door, to record the ultrasound echoes, and to integrate the intensity of the echoes during the fixed period. The controller is further programmed to repeatedly compare the integrated values to a standard. According to a preferred embodiment, multiple ultrasound transmitter/receivers are directed at the volume of space adjacent the door generally directed at the floor and the integrated echoes of all transmitter/receivers are summed.

According to a preferred embodiment, the response period is insufficiently long for an echo to be received from the floor.

According to yet another embodiment, multiple, separate response periods are recorded and integrated to establish standard values for each response period.

According to yet another embodiment, multiple response periods, at least one sufficiently long enough to receive an echo from the floor and one insufficiently long to receive an echo from the floor, are recorded and integrated to establish standard values for each response period.

In yet another embodiment, at preset multiple positions of the door as it is being opened and/or closed, the controller triggers an ultrasound pulse into the volume of space and records ultrasound echo signals for a short fixed response period, integrates the intensity of the echo signals, and stores the integrated echo signals as standards for an unobstructed doorway. The controller is further programmed for during door opening and/or closing to trigger an ultrasound pulse at the preset positions, record the echo signals during the short fixed response period, integrate the intensity of the signals and compare the integrated signals to the standard for each door position.

DESCRIPTION OF THE PREFERRED EMBODIMENTS

According to one embodiment of this invention, the entire echo signal is recorded and digitized for a given period of time. Multi-bit digitalization of the echo signal may be stored in multiple memory locations corresponding to echo return times. The entries in each location are summed or integrated. At the time of setup when no passenger or object is in the vicinity of the doorway, the sum total of the echo signal is stored as a standard or reference. This summing or integration takes into account amplitude as well as time. Since most real world targets cause multiple reflections instead of a single echo pulse at a single time after the output pulse, taking full account of amplitude verses time allows increased likelihood of detection. Appropriate algorithms may be used to repeat the setup to accommodate slow, environmentally-caused changes in the standard or reference. Such changes might be brought about by changes in temperature or humidity. Rapid changes would be considered indicative of a passenger.

Figure 1:
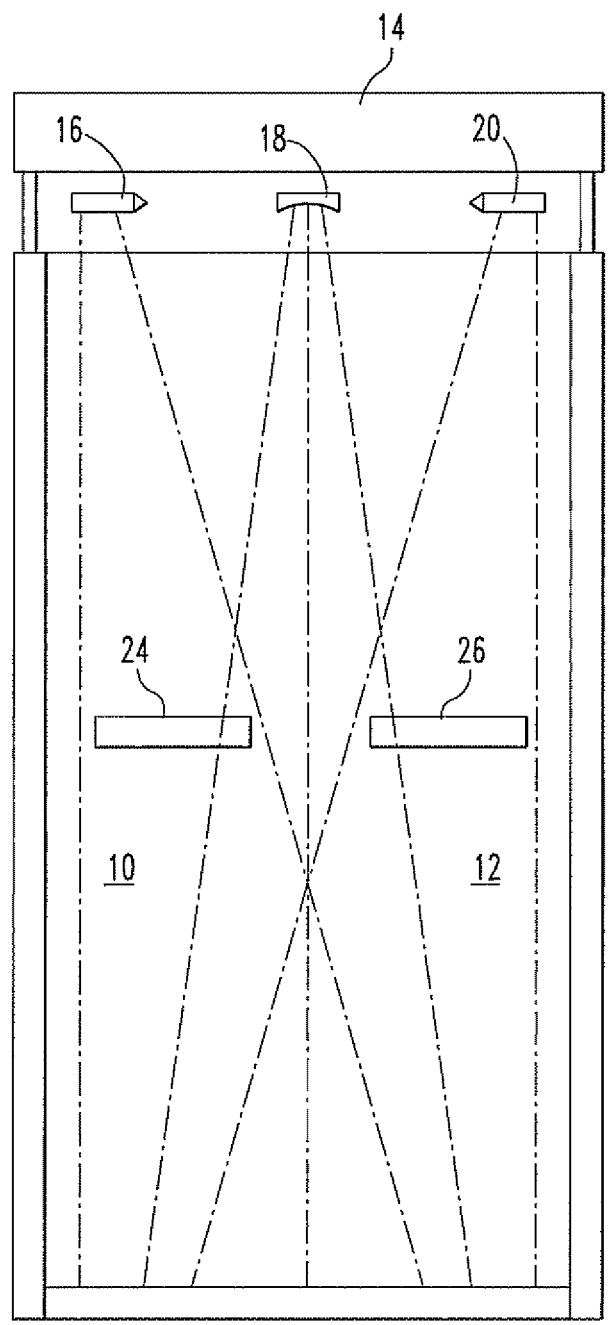
FIG. 1 illustrates the placement of ultrasound sensors relative to a transit doorway according to one embodiment of this invention.

Referring to FIG. 1, the inside face of a doorway is illustrated. The door has two sections 10, 12 that swing by reason of the well-known actuating assembly illustrated as a box 14. The doors may be any of swing doors, bifold doors, slide-glide doors or parallelogram plug doors, for example. The door is illustrated with protruding handles 24, 26 for purposes of illustrating permanent objects that will reflect an ultrasound pulse. Mounted under the actuator assembly are three spaced ultrasound transmitter/receivers 16, 18, 20 directed downwardly toward the floor 22. Ultrasound pulses emitted from the transmitter/receivers are directed in overlapping cones illustrated by lines on FIG. 1.

Figure 2:
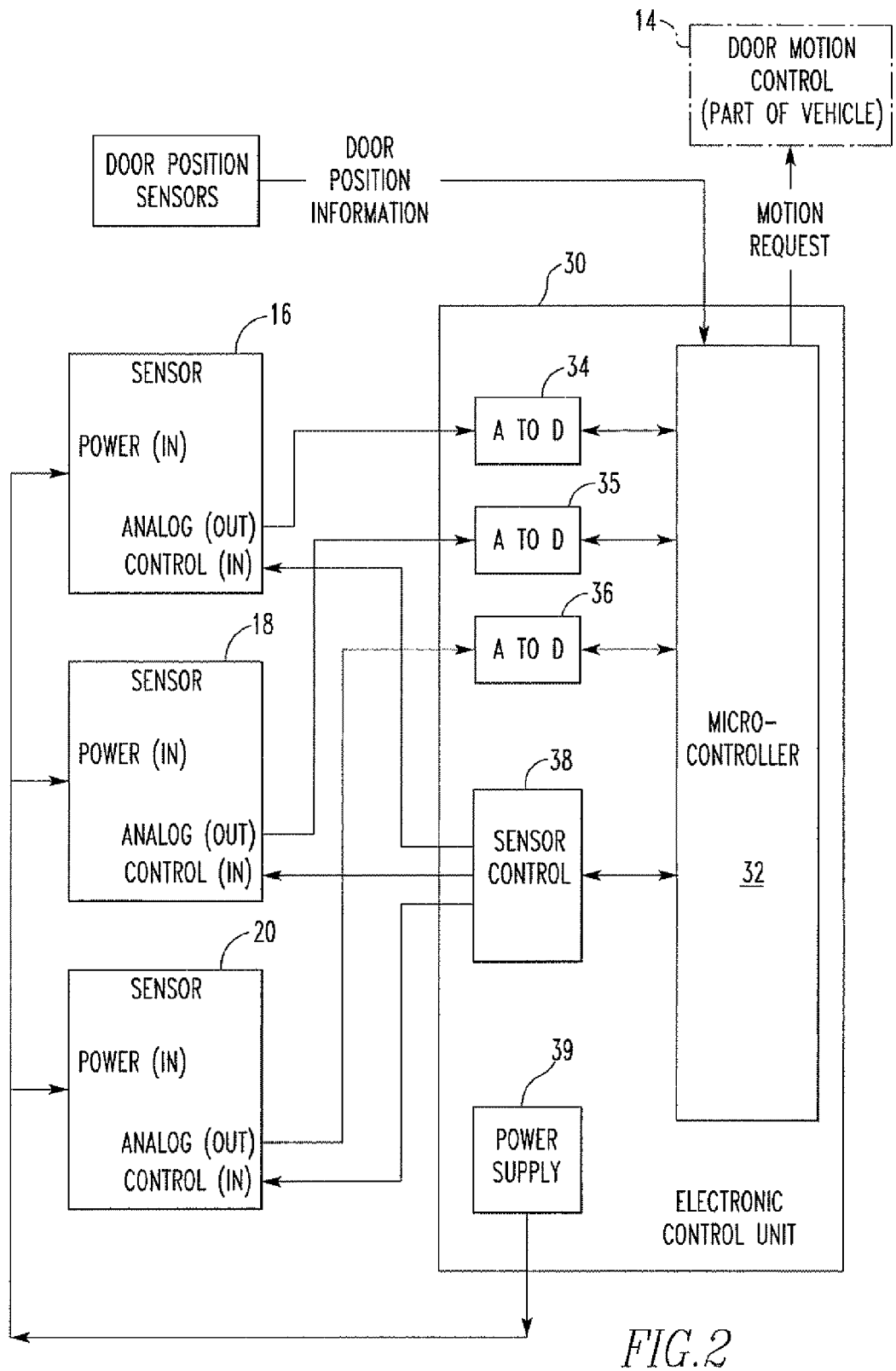
FIG. 2 is a diagram of a circuit for practice of one embodiment of this invention.

Referring now to FIG. 2, the three ultrasound transmitter/receivers (sensors) 16, 18 and 20 are connected to an electronic control unit 30. The electronic control unit comprises a microcontroller 32, three analog-to-digital converters 34, 35, 36, a power supply 39 for the electric control unit 30 and for the transmitter/receivers.

The electric control unit 30 triggers ultrasound pulses via sensor control 38 and the transmitter/receivers 16, 18, 20 and then permits the transmitter/receivers to listen for echoes for a preset response period which may be established insufficiently long for an echo to be received from the floor. The received echoes are returned via the analog-to-digital converters 34, 35, 36 and the microcontroller 32 integrates the intensity of the echoes during at least a fixed portion of the response period and stores the integrated signal.

The microcontroller 32 is programmed to repeatedly trigger the transmitter/receivers to emit an ultrasound pulse into the volume of space adjacent the door. The controller is further programmed to repeatedly compare the integrated values to a standard.

Figure 3A:
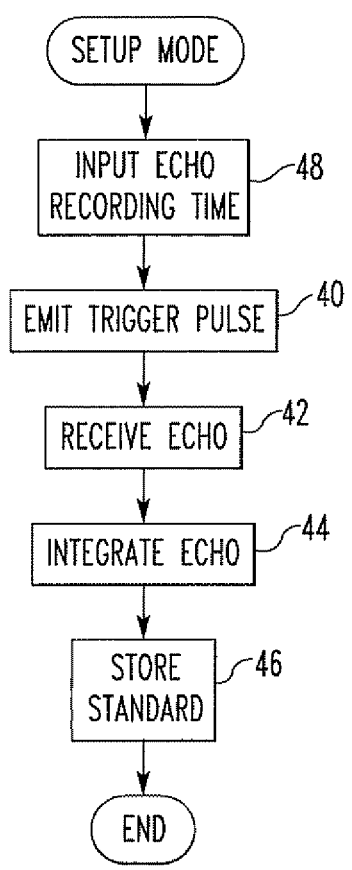
FIG. 3A is a flow diagram illustrating the programming of the microcontroller according to one embodiment of this invention during the setup mode.

Referring to FIG. 3A, the microprocessor is programmed to operate in the setup mode to emit a trigger pulse or a plurality of trigger pulses at 40, to receive echo signals caused from each pulse during a period of time which may be established insufficient to receive an echo from the floor at 42, to integrate the echo signals at 44, and store the integrated results as a standard at 46. During the setup, it is necessary to adjust the length of time following a pulse that echoes will be received. This may be accomplished by measuring the distance from the transmitter/receiver to the floor and dividing by the speed of sound. As the speed of sound can vary slightly with ambient conditions, the time period should be somewhat longer or shorter than calculated from the measurement. This may be a first step 48 in the setup mode. According to a preferred embodiment, the setup is run for both the door closed condition and the door open condition enabling the determination of a passenger waiting to exit as well as whether a passenger has cleared the doorway.

Figure 3B:
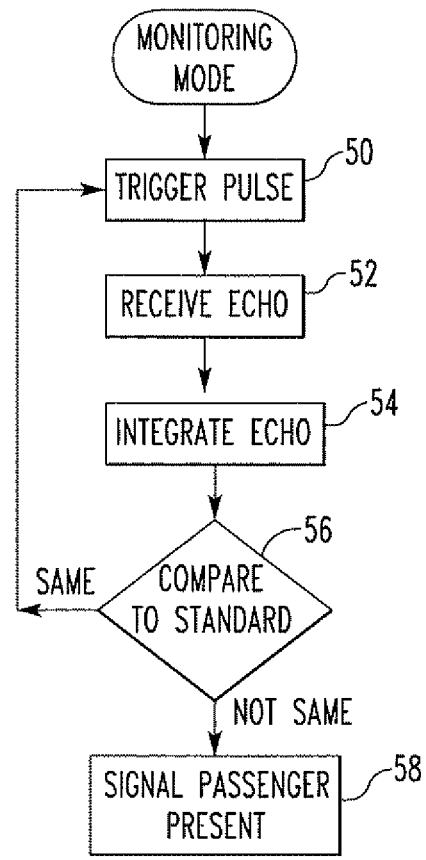
FIG. 3B is a flow diagram illustrating the programming of the microcontroller according to one embodiment of this invention during the monitoring mode.

Referring to FIG. 3B, the microprocessor is programmed to operate in the monitoring mode to emit a trigger pulse or a plurality of trigger pulses at 50, to receive echo signals caused from each pulse during a period of time insufficient to receive an echo from the floor at 52, to integrate the echo signals at 54, and compare the integrated results to a standard at 56. If the integrated result is sufficiently close to the stored standard, control returns to emitting a new trigger pulse at 50. If the integrated result is not sufficiently close to the stored standard, a signal indicative of a passenger present at the door is output at 58.

Of course, the microprocessor may be programmed with additional tasks such as keeping track of whether the door is open or shut and for how long a period of time based upon additional inputs.

Having thus described our invention in the detail and particularity required by the Patent Laws, what is desired protected by Letters Patent is set forth in the following claims.

The invention claimed is:

1. A method of recognizing the presence of a passenger in front of a door of a transit vehicle comprising the steps of:
   at preset multiple positions of the door as it is opening or closing directing an ultrasound transmitter/receiver at a volume of space adjacent the door and generally directed at the floor in front of the door;
   emitting an ultrasound pulse via the transmitter/receiver into said volume of space while the space is not occupied by a passenger;
   recording the ultrasound echoes from objects in the volume of space for at least one response period;
   integrating intensity of said echoes during at least a fixed portion of the at least one response period and storing the integrated values as standard values;
   repeatedly at preset multiple positions of the door as it is opening or closing emitting an ultrasound pulse via the transmitter/receiver into said volume of space, recording the ultrasound echoes, and integrating the intensity of said echoes during said fixed period; and
   repeatedly comparing the integrated values to the stored standard value such that when the integrated value differs from the standard value for each preset position by a given amount, a passenger is deemed to have entered the volume of space adjacent the door.

2. The method according to claim 1, wherein multiple ultrasound transmitter/receivers are directed at the volume of space adjacent the door and generally directed at the floor, and summing the integrated echoes received at each transmitter/receiver.

3. The method according to claim 1, wherein the at least one response period is insufficiently long for an echo to be received from the floor.

4. The method according to claim 1, wherein multiple separate response periods are recorded and integrated to establish standard values for each response period.

5. The method according to claim 1, wherein multiple response periods, at least one sufficiently long enough to receive an echo from the floor and one insufficiently long to receive an echo from the floor are recorded and integrated to establish standard values for each response period.

6. A system for recognizing the presence of a passenger adjacent a door of a transit vehicle comprising:
   an ultrasound transmitter/receiver directed at a volume of space adjacent said door and generally directed at the floor near the door;
   a controller for triggering an ultrasound pulse via the transmitter/receiver into said volume of space at preset multiple positions of the door as it is opening or closing while the space is not occupied by a passenger and recording the ultrasound echoes from objects in the volume of space for at least one response period and integrating the intensity of the echoes during at least a fixed portion of the at least one response period and storing the integrated values as standard values;
   said controller programmed to repeatedly emit an ultrasound pulse via the transmitter/receiver into said volume of space adjacent the door, to record the ultrasound echoes, and to integrate the intensity of said echoes during said fixed period; and said controller further programmed to repeatedly compare the integrated values to standard values for each preset position.

7. A system according to claim 6 comprising multiple ultrasound transmitter/receivers directed at the volume of space adjacent the door generally directed at the floor and wherein the integrated echoes of all transmitter/receivers are summed.

8. The system according to claim 6, wherein the at least one response period is insufficiently long for an echo to be received from the floor.

9. The system according to claim 6, wherein multiple separate response periods are recorded and integrated to establish standard values for each response period.

10. The system according to claim 6, wherein multiple response periods, at least one sufficiently long enough to receive an echo from the floor and one insufficiently long to receive an echo from the floor, are recorded and integrated to establish standard values for each response period.

\* \* \* \* \*

UNITED STATES PATENT AND TRADEMARK OFFICE
CERTIFICATE OF CORRECTION

| | | |
|---|---|---|
| PATENT NO. | : 8,791,839 B2 | Page 1 of 1 |
| APPLICATION NO. | : 12/992319 | |
| DATED | : July 29, 2014 | |
| INVENTOR(S) | : James W. Citta et al. | |

It is certified that error appears in the above-identified patent and that said Letters Patent is hereby corrected as shown below:

Title Page, Item (60) Related U.S. Application Data, Line 1, delete "61/085,977" and insert -- 61/058,977 --

Signed and Sealed this
Ninth Day of December, 2014

Michelle K. Lee
*Deputy Director of the United States Patent and Trademark Office*